Dec. 3, 1968  G. F. NORDBLOM ET AL  3,414,486
METHOD FOR PRODUCING FLAKES OF NICKEL
Filed Feb. 18, 1966

3,414,486
METHOD FOR PRODUCING FLAKES OF NICKEL
George F. Nordblom, Yardley, and George W. Bodamer, Cheltenham, Pa., assignors, by mesne assignments, to ESB Incorporated, Philadelphia, Pa., a corporation of Delaware
Filed Feb. 18, 1966, Ser. No. 528,429
5 Claims. (Cl. 204—10)

ABSTRACT OF THE DISCLOSURE

Small flakes of metallic nickel, about 1/16-inch square and about 0.000040 inch thick, are deposited from solution onto a cylindrical cathode. A gridded belt made from an electrically non-conducting material is wrapped about at least a portion of the cathode surface. Flakes are removed from the cathodes by sprays of electrolyte or other fluids. The flakes are suitable for use in nickel-alkaline batteries.

---

Figure 1:
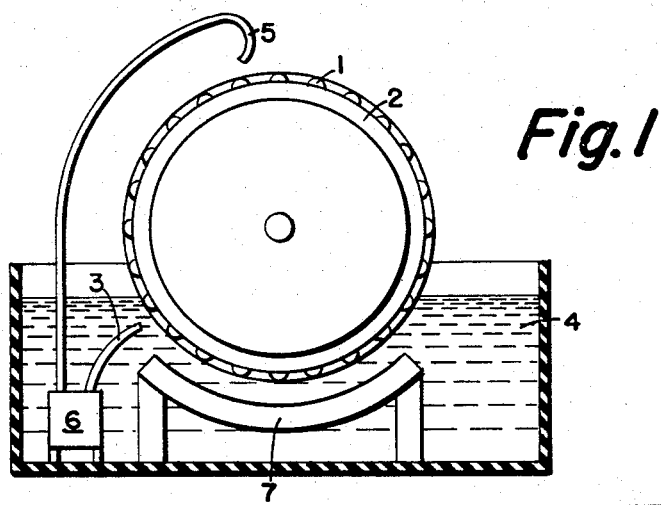

This invention relates to a method of producing flakes of nickel, and to the apparatus used to produce the flakes.

This invention is related to one disclosed in another application filed on the same date as this one, in which George F. Nordblom, one of the applicants herein, is the applicant.

Small flakes of metallic nickel, about 1/16-inch square and about 0.000040 inch thick, are usually packed in the tubular positive plates of nickel-alkaline batteries along with nickel oxyhydrate active material to increase the conductivity of the positive plates. Since the days of Thomas Edison, these flakes have been produced by electro-depositing numerous alternate layers of nickel and copper on a cathode in electrolyte baths to form large sandwiched sheets. The sheets have then been cut into small squares, following which the copper layers were dissolved out, leaving only the tiny nickel flakes. The flakes were then washed, dried, and screened before being put into the positive plates of the battery. This long-known process has produced flakes which were generally satisfactory, but the process was objectionable because it was expensive. This old process was characterized by loss of nickel during the copper dissolution step, failure of the flakes to become completely separated, high copper losses and recovery costs, and cumbersome and expensive mechanical and electrochemical processes. What has been needed for many years was a process of making nickel flakes of the desired shape in which the deposition and subsequent dissolution of copper could be eliminated, for both steps were time consuming and the expense involved was great.

It is the object of this invention to provide a process by which nickel flakes can be deposited directly on the cathode, and subsequently be easily removed, and which will produce flakes suitable for use in nickel-alkaline batteries.

It is a further object of the invention to provide apparatus suitable for producing nickel flakes.

Methods of producing nickel flakes to be used for other purposes are known, but the flakes produced by these processes have proved to be unsatisfactory for use in nickel-alkaline batteries. For instance, in United States Patent No. 2,365,356, issued on December 19, 1944, to N. Pilling and A. Wesley, there is disclosed a method of producing nickel flakes to be used in paint pigments. In this process a highly strained deposit of sheet nickel is produced so that the plated nickel will break up automatically into flakes and slough off the stainless steel cathode. This process has proved to be unsatisfactory for producing flakes for batteries, because the flakes so produced tend to curl very tightly; to be satisfactory for use in batteries the flakes must remain essentially flat. The flakes produced by this process are also too thick for satisfactory use in batteries.

This invention involves the use of a perforated or gridded belt made from an electrically non-conducting material which is wrapped about at least a portion of the electrically conducting surface of a cylindrical cathode. Nickel then is deposited on the exposed conducting portions of the cathode surface when the cathode is immersed in an electrolyte containing nickel ions and a source of electric current is connected to the cathode. Flakes of nickel form on the exposed areas of the cathode surface and are subsequently removed from the cathode. As will be shown in greater detail below, several methods of employing the belt with the cylindrical cathode may be used, and also several methods of removing the flakes are available.

Figure 2:
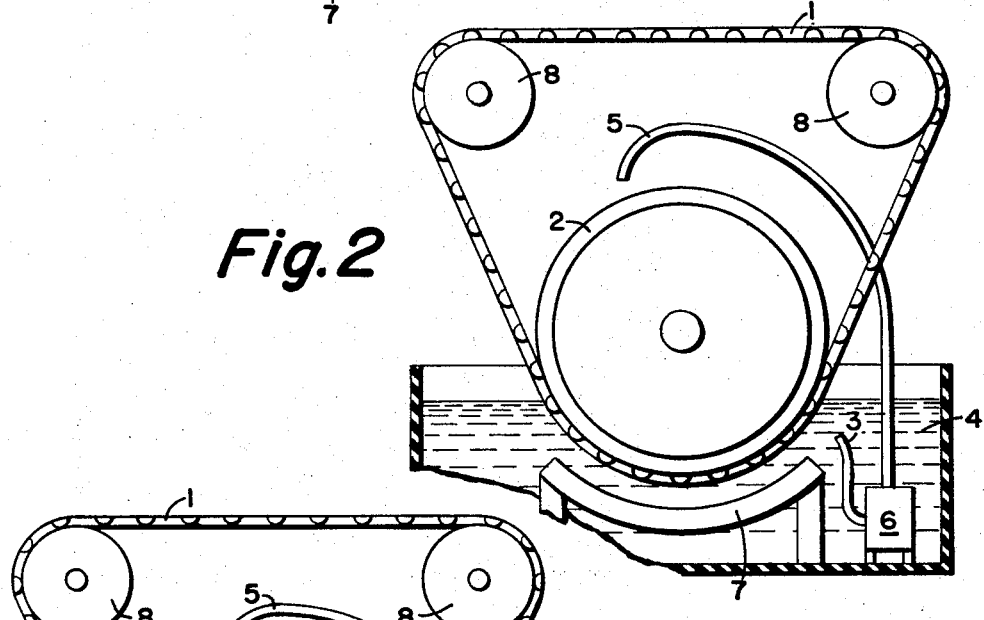
Figure 3:
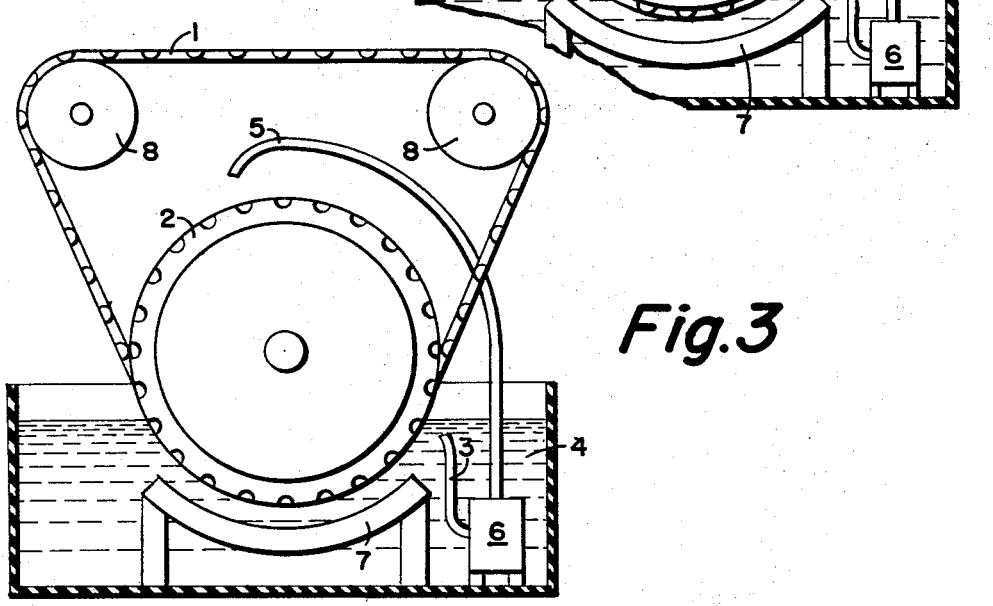

The invention will be explained in greater detail by making reference to the drawings, in which FIGURE 1 is a cross-sectional view of the apparatus involved in this invention in which the belt is wrapped entirely around the cylindrical cathode;

FIGURE 2 is a cross-sectional view similar to FIGURE 1 but showing the belt traveling around two idling pulleys and the cathode rather than being wrapped entirely about the cathode; and, FIGURE 3 is a cross-sectional view similar to FIGURE 2, but showing the cathode having grooves to engage the gridded belt in sprocket-and-chain fashion.

The cylindrical cathode must be made from a material which will permit the nickel to be removed from its surface; stainless steel or chrome-plated steel are known to be acceptable materials meeting this requirement.

The belt should be made from a material which is electrically non-conducting, non-reactive with the electrolyte with which it is to be used, capable of being formed into the desired grid shape, and sufficiently elastic to be functional with the other apparatus employed. No doubt there are numerous suitable materials from which the belt could be made, with many rubbers being known to be acceptable. This invention should not be regarded as being limited to the material from which the belt is formed.

Likewise, this invention is not to be limited to use with one or more particular nickel ion electrolyte baths, for no doubt many solutions could be found which would be acceptable. A composition which is known to be satisfactory consists of 150 grams/liter of nickel carbonate, 250 grams/liter of sulfamic acid, 26 grams/liter of boric acid, and 37 milliliters/liter of an 18% nickel bromide solution. Good results were achieved using this bath at 48° C. using current densities as high as 200 amps/square foot, and at 39° C. a current density of 100 amps/square foot proved satisfactory. An alternate bath consisting of 30 ounces per gallon of nickel fluoborate containing 7½ ounces per gallon of metallic nickel produced good flake when a current density of 85 amps/square foot was used in a bath at 40° C.

The preferred method of removing the nickel flakes from the cathode is to use a spray of electrolyte because this is generally satisfactory. Jets of other fluids can likewise be used where they will not contaminate or dilute the plating bath. The choice of which way the flake is removed depends on economics.

Several methods of employing the belt with the cylindrical cathode may be used. As shown in FIGURE 1, the belt 1 may be wrapped entirely around the cathode 2. If this is done, it may be helpful to apply a jet 3 of electrolyte 4 against the submerged portion of the cathode to remove any hydrogen or other gases which might collect on the cathode between the grids of the belt. A simple jet 5 of electrolyte could be used to remove the flake, as shown in FIGURE 1. Both jets 3 and 5 may be supplied from a common pump 6. An anode 7 is submerged in the electrolyte 4.

FIGURE 2 depicts the use of a pair of idling pulleys 8 which could be employed with the belt if desired. Similarly, the cathode 2 could be notched as at 9 to engage the belt in a sprocket-and-chain fashion if desired, as shown in FIGURE 3.

Obviously numerous variations embodying our invention are possible, for the invention may be utilized with a variety of belt materials, electrolyte compositions, and methods of removing the nickel flake. The belt may be used with the cathode in several ways. The invention should be viewed in this light.

The nickel flakes produced by any of the methods described above, which involve depositing nickel on a gridded cathode, have been placed in batteries and compared with the nickel produced by the old method in which copper is first plated in alternate layers with the nickel and then later dissolved. Flakes produced by the Edison process were packed into tubes and tamped with a machine having a tamper weighing 1581 grams. Alternate layers of active material and nickel flake were packed into the tube until the tube contained 210 layers of each material. Each layer of active material consisted of 0.0326 gram, and the nickel flake comprised 13.6 percent of the total material introduce into the tube. After being formed against a cadmium negative, the tube was charged at 93 milliamps for 15 hours, rested an hour, discharged at 187½ milliamps, and run through 16 charge-discharge cycles. The average capacity developed using this Edison-type flake was 0.155 ampere hours/gram. Utilizing flake produced by the methods described above in which the sulfamate electrolyte was used, this test procedure was repeated, with the only variation being that the amount of flake used was 13.9 percent of the total; the capacity of this tube was 0.158 ampere hours/gram. Utilizing flake produced by the methods described above in which the fluoroborate electrolyte was used, this test procedure was again repeated, with the amount of flake used being 9.0 percent of the total; the capacity of this tube was 0.153 ampere hours/gram.

The comparisons warrant the conclusion that the nickel flakes produced by this invention are as acceptable as those made by the former method.

Having described our invention so that those skilled in the art may understand it, what we claim is the following:

1. A method of producing nickel flake which comprises:
   (a) imersing into an electrolyte bath containing nickel ions a cylindrical cathode around the surface of which there is a gridded belt made from an electrically non-conducting material;
   (b) applying an electric current through the electrolyte bath between the cathode and an anode also immersed in the electrolyte to deposit nickel on the exposed areas of the cathode;
   (c) rotating the cathode and the belt so that the portions of the cathode left exposed by the belt are passed through the electrolyte; and
   (d) removing the nickel from the grids of the cathode by the force of a stream of fluid.

2. The method of claim 1 wherein the cathode is removed from the electrolyte bath after the nickel is deposited on the cathode but before the nickel is removed from the cathode.

3. The method of claim 1 wherein the nickel is removed from the cathode while the cathode is in the electrolyte.

4. The method of claim 1 wherein the nickel is removed from the gridded cathode by the force of a stream of the electrolyte.

5. The method of claim 1 wherein the nickel is removed from the gridded cathode by the force of a stream of water.

References Cited

UNITED STATES PATENTS

| 2,365,356 | 12/1944 | Pilling et al. | 106—290 |
| 2,773,816 | 8/1952 | Wesley et al. | 204—12 |

FOREIGN PATENTS

| 776,136 | 1/1968 | Canada. | |

JOHN H. MACK, *Primary Examiner.*

R. L. ANDREWS, *Assistant Examiner.*